Feb. 9, 1943.　　　C. G. BROSTROM　　　2,310,211
ROUGHING TOOL
Filed July 28, 1941

INVENTOR
Charles G. Brostrom
By his Atty

Patented Feb. 9, 1943

2,310,211

UNITED STATES PATENT OFFICE 2,310,211

ROUGHING TOOL

Charles G. Brostrom, Salem, Mass., assignor to United Shoe Machinery Corporation, Flemington, N. J., a corporation of New Jersey Application July 28, 1941, Serial No. 404,284

6 Claims. (Cl. 69—1)

This invention relates to roughing tools and is herein illustrated and described as embodied in a tool which may be mounted upon the tool shaft of a shoe roughing machine used for roughening the lasted margin of an upper or the margin of a sole, or the like, to prepare the surface for the reception of cement.

The object of the invention is to provide an exceptionally simple and inexpensive roughing tool which forms a rigid, unitary structure, when mounted, and the operating element of which can be easily, quickly and cheaply replaced when it has become dull.

With this object in view, there is provided, in accordance with the invention, a roughing tool comprising a cylindrical hub having a helical, ribbon-like roughing element removably inserted in its peripheral surface. In the illustrated form of the tool, the roughing element consists of a portion of a band saw blade wound into a helix with the teeth of the blade pointed outward and screwed into a steep helical groove cut in the periphery of the hub. In order that the roughing element may be clamped securely in place, the two endmost convolutions of the helical groove are disposed in planes perpendicular to the axis of rotation of the tool and clamping shields are arranged to press the two endmost convolutions of the roughing element firmly against the sides of the groove, whereby the tool becomes, in effect, a rigid unit.

In order to permit the escape of the dust produced by the roughing operation, which dust is fed transversely of the tool by the convolutions of the saw blade during the rotation of the tool, one of the end shields is provided with an elongated slot at the exit point of the dust from the space between the convolutions of the blade.

These and other features of the invention will be better understood and appreciated from reading the following detailed description of a satisfactory, practical embodiment thereof in connection with the accompanying drawing, in which Fig. 1 is an exploded view, on an enlarged scale, of one form of roughing tool;

Figures 3, 4:
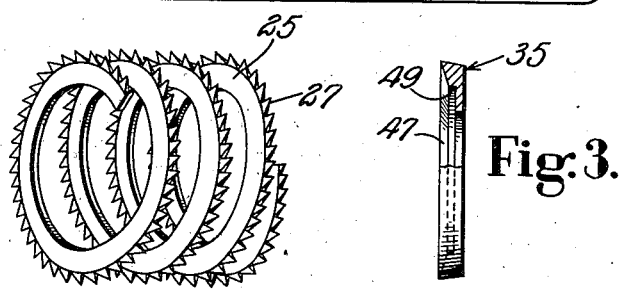
Fig. 3 is a similar view of a guard shield at the opposite end of the tool, the section being taken on the line III—III of Fig. 1.
Fig. 4 is an angular view of the roughing element of the tool.
Figure 8:
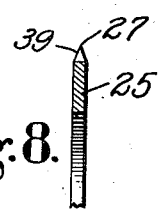
Fig. 8 is a cross sectional view showing a detail of the roughing element.

The roughing tool 20 comprises a cylindrical hub 21 in which is cut a steep helical groove 23. The actual roughing element consists of a helically wound, ribbon-like member 25 having sharp, pointed teeth 27 of the form clearly illustrated in Figs. 4 and 8. This member may be made conveniently and cheaply by winding a section of band saw blade of indefinite length around a suitable mandrel, grinding the sides of the teeth to equal bevels, and cutting off a portion of the correct length for the desired tool.

The helical roughing element 25 is screwed into the groove 23 in the hub 21 from which, when the teeth become dull, it can easily be removed to permit the insertion of a new roughing element. This roughing element is so cheap that it is more economical to throw it away when it becomes dull and replace it with a new one, than it would be to resharpen the teeth.

Figure 1:
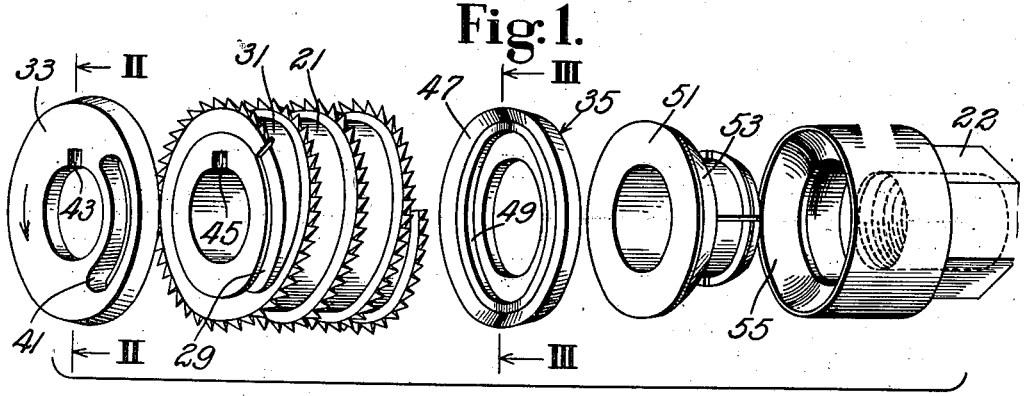
Figure 2:
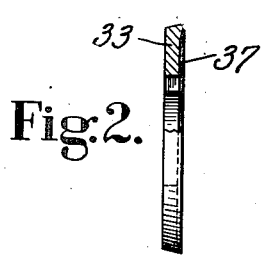
Fig. 2 is a view in edge elevation, partly in section, on the line II—II of Fig. 1, of one of the guard shields of the tool.

A shoulder 29 as shown in Fig. 1 is provided at each end of the hub 21. The flat surface of this shoulder is at right angles to the axis of rotation of the hub and is offset from the end of the hub a distance somewhat less than the thickness of the saw blade material of which the roughing element 25 is made. The hub outside of the shoulder is of the same diameter as the bottom of the groove 23, and the endmost convolution of the helical member 25 is held against the shoulder 29 so that a considerable portion of said convolution is held in a plane at right angles to the axis of the tool. The blade 25, when in proper position, terminates at some distance from the point where the groove 23 emerges, in order to provide a gap, as shown at 31, for the discharge of leather dust which might otherwise clog the tool. The tool is adapted to be mounted upon the tool shaft of a roughing machine and, for the purpose of clamping the roughing blade 25 securely in the groove 23 in the hub 21, shields 33 and 35 are provided. The shield 33 is arranged to bear against the endmost convolution of the blade 25 at the left-hand end of the hub 21 and to clamp the blade tightly against the surface 29. The right-hand face of the shield 33 is hollowed out slightly, as shown at 37 in Fig. 2, in order that the portion of the shield next to its circumference shall bear against the beveled sides 39 (Fig. 8) of the teeth 27. An arcuate slot 41, extending through the shield 33, provides for the escape of leather dust emerging through the gap 31 between the convolutions of the tool blade. Notches 43, 45 in the shield 33 and the hub 21 respectively cooperate with a key on the tool of the machine shaft to insure proper register of the slot 41 with the gap 31 to facilitate the escape of the dust.

The outer shield 35 has its left-hand, or inner, face 47 formed similarly to the face 37 of the shield 33, with additional clearance space at 49 to insure that all of the clamp-pressure shall be exerted on the blade.

The parts just described are assembled on the shaft in the order shown in Fig. 1, and a pressure equalizing member 51, having a convex spherical zone 53, is then placed on the shaft outside of the assembly. A nut 22 has an internal spherical surface 55 cooperating with the surface of the zone 53 to apply axial pressure evenly to the assembly. As the parts are forced together by tightening the nut, the end portions of the roughing blade 25 are clamped firmly against the shoulders 29, thus maintaining the entire tool assembly rigid.

Figure 5:
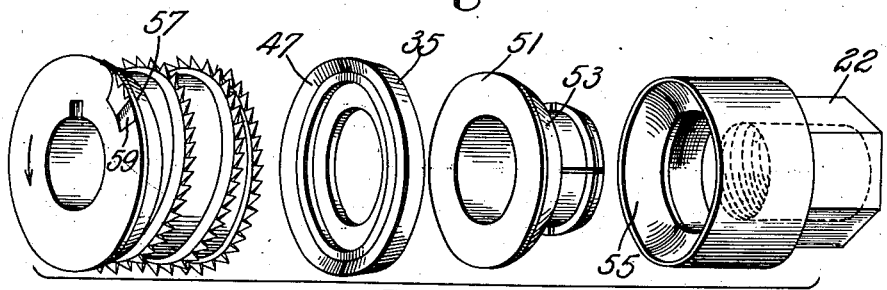
Fig. 5 is a view similar to Fig. 1, showing an alternative form of tool.
Figure 6:
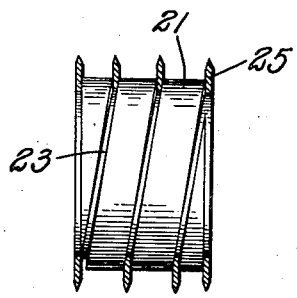
Fig. 6 is a view in front elevation of the hub and roughing element of the tool shown in Fig. 1.
Figure 7:
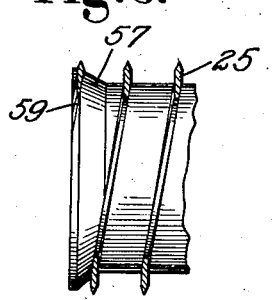
Fig. 7 is a similar view of a portion of the tool shown in Fig. 5.

In the modified form of tool shown in Figs. 5 and 7, the inner end of the hub is formed with a flaring, frusto-conical portion 57 and the shield 33 is omitted. Moreover, the shoulder 29 is not used at the inner end of the hub, the helical groove emerging at the end of the hub as shown at 59.

This form of tool is designed for use when it is desired to rough all of the way to the edge of a sole; when it is desired to leave a narrow, unroughened margin outside the roughened band on the sole, the tool shown in Fig. 1 is used, shields 33 of different thicknesses being supplied to be used in accordance with the width of the unroughened margin desired. The end shields 33, 35, or the enlarged portion 57 of the hub, also serve as gages to determine the depth to which the teeth 27 shall penetrate the work, their radii being less than the radius of the helical element 25 by an amount equal to the desired depth of penetration.

Having described the invention, what is claimed as new and desired to be secured by Letters Patent of the United States is:

1. A tool for roughing shoe parts, comprising a cylindrical hub and a helical, ribbon-like, toothed, roughing element inserted in the convexed, peripheral surface of said hub.

2. A tool as defined in claim 1 in which the roughing element consists of a helically wound saw blade the teeth of which point radially outward.

3. A tool for roughing shoe parts, comprising a cylindrical hub having a steep helical groove cut in its cylindrical surface, and a saw blade so positioned in said groove that the teeth of the blade project beyond the cylindrical surface of the hub.

4. A tool for roughing shoe parts, comprising a cylindrical hub having cut in its periphery, a helical groove the final portions of the two endmost convolutions of which are disposed perpendicularly to the axis of rotation of the tool, a helical, ribbon-like roughing element in said groove, and shields clamping the ends of said element against the sides of said final portions of the groove.

5. A tool as defined in claim 4 in which one of the shields is provided with an elongated slot to permit the escape of dust from the roughing element.

6. A tool for roughing shoe parts, comprising a cylindrical hub having a single helical groove in its cylindrical face, and a single, narrow saw blade bent in its own plane into a plural convolution helix with the teeth pointing radially outward, said blade being seated in said helical groove.

CHARLES G. BROSTROM.